United States Patent [19]
Torrel et al.

[11] Patent Number: 5,994,579
[45] Date of Patent: Nov. 30, 1999

[54] PROCESS FOR LIGHTENING THE COLOR OF POLYMERIC DIPHENYLMETHANE DIISOCYANATE AND THE USE OF BRIGHTENED DIPHENYLMETHANE DIISOCYANATE IN THE PRODUCTION OF POLYURETHANE

[75] Inventors: Juan Morell Torrel, Vila-Seca; Salvador Vidal Rodriguez, Tarragona; Vicente Requena Alda, Cambrils, all of Spain

[73] Assignee: Bayer Aktiengesellschaft, Leverkusen, Germany

[21] Appl. No.: 09/275,289

[22] Filed: Mar. 24, 1999

[30] Foreign Application Priority Data

Apr. 3, 1998 [DE] Germany .............................. 198 15 055

[51] Int. Cl.⁶ .......................... C07C 263/00; B10D 33/00
[52] U.S. Cl. .......................... 560/347; 210/748; 204/901; 204/158.2; 204/158.21; 522/913; 528/44
[58] Field of Search ................................. 204/901, 158.2, 204/158.21; 560/347; 210/748; 528/44

[56] References Cited

U.S. PATENT DOCUMENTS

| 4,465,639 | 8/1984 | Hatfield, Jr. ............................. 560/347 |
| 5,312,971 | 5/1994 | Adkins et al. ........................... 560/347 |
| 5,583,251 | 12/1996 | Buysch et al. ........................... 560/347 |

FOREIGN PATENT DOCUMENTS 4318018  12/1994  Germany .

*Primary Examiner*—James J. Seidleck
*Assistant Examiner*—Sanza McClendon
*Attorney, Agent, or Firm*—Joseph C. Gil; N. Denise Brown

[57] ABSTRACT

A process for lightening (or decreasing) the color of diphenylmethane diisocyanate by irradiation with light having a wavelength of from 250 nm to 2,500 nm is described. This invention also relates to the use of this brightened diphenylmethane diisocyanate as the isocyanate component in a process for the production of polyurethane plastics by the isocyanate polyaddition process.

7 Claims, 2 Drawing Sheets

PROCESS FOR LIGHTENING THE COLOR OF POLYMERIC DIPHENYLMETHANE DIISOCYANATE AND THE USE OF BRIGHTENED DIPHENYLMETHANE DIISOCYANATE IN THE PRODUCTION OF POLYURETHANE

The present invention relates to a process for the production of polyisocyanates or polyisocyanate mixtures of the diphenylmethane series, referred to below as MDI-polymer, by irradiation with light of a particular wavelength and to the polyisocyanates thus obtained and their use in the production of polyurethane plastics.

The large-scale production of isocyanates by the reaction of amines with phosgene in solvents is well-known and is described in detail in the literature. See, for example, Ullmanns Enzyklopädie der technischen Chemie, 4th Edition, Volume 13, page 347 to 357, Verlag Chemie GmbH, D-6940 Weinheim, 1977. This process is the basis for the preparation of the polyisocyanate mixture used as the polyisocyanate component in the production of polyurethane foams and of other polyurethane plastics produced by the polyaddition process.

It is generally known that unwanted dyes or coloring components are also formed in this process and remain in the polyisocyanate component. In fact, these unwanted dyes or coloring components are preserved during the further processing of the polyisocyanate component to polyurethane foams and/or to other polyurethane plastics.

The extinction value (or e-value) at various wavelengths is used as a measure of the discoloration of the polyisocyanate.

For a fairly long time, the lowering of the chromatic values of MDI-polymer has been the objective of numerous experiments and assignments. These are known and described in the literature.

Thus, for example, DE-A 94-4411911 describes the treatment of such isocyanate mixtures with hydrogen in the presence of supported catalysts.

EP-A 0,114,970 describes a method involving addition of water to the reaction process. DE-A 4,318,018 discloses a process which brings about a lightening of the color (i.e. a color decrease) with the aid of hydrochloric acid and antioxidants.

A disadvantage in all these processes is that they are expensive technically and/or they require the use of auxiliary substances which are not isocyanates.

Accordingly, an object of the present invention was to develop a technically simple and reliable process which permits the production of polyisocyanates or polyisocyanate mixtures of the diphenylmethane series having chromatic values as low as possible, without any changes in the rest of their properties.

Surprisingly, this object could be achieved by the process according to the invention.

SUMMARY OF THE INVENTION

The present invention provides a process for the production of polymethylene poly(phenyl isocyanate), i.e. polymeric MDI or PMDI, in which the MDI formed by the phosgenation of the amines is treated (specifically irradiated) with light of a wavelength of between 250 nm and 2,500 nm. This process of treating polymethylene poly(phenyl isocyanate) with light of the above-specified wavelength decreases the color, or lightens, the polymethylene poly(phenyl isocyanate).

DETAILED DESCRIPTION OF THE INVENTION

Figure 1:
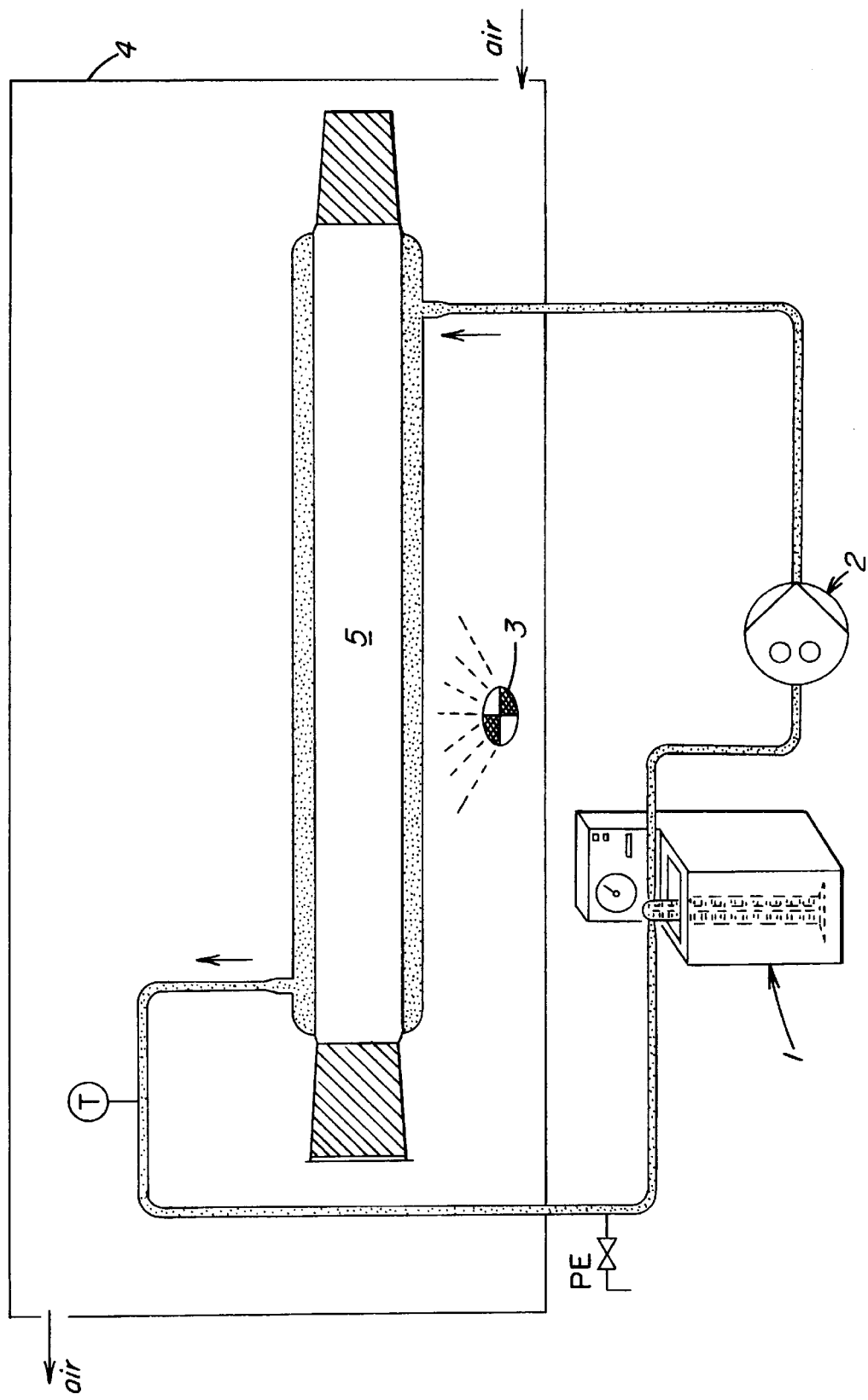
FIG. 1 illustrates one simple arrangement of equipment which can be used to treat PMDI with light of various wavelengths.

The process of the present is typically carried out by pumping the polyisocyanate product through a glass reactor in a loop system, and irradiating it with light of a particular wavelength. Light in the UV (ultraviolet) range is preferred, and in particular light having a wavelength of between 300 and 450 nm is more preferred. Reactors are made preferably of quartz glass or of another type of glass which does not absorb the wavelength of the light that is being applied. Depending on the type of reactor used, the irradiation source be located either on the outside of the reactor or on the inside of the reactor. To increase the efficiency of the light treatment, the reactors and/or the lamps may also be incorporated in metallized housings.

Generally the polymethylene poly(phenyl isocyanate) is irradiated for a period of from about 2 seconds to about 30 minutes, and preferably from about 5 seconds to about 10 minutes.

Suitable polymethylene poly(phenyl isocyanates) to be used as starting materials for the process according to the present invention comprise technical mixtures of 4,4'-diphenylmethane diisocyanate with up to 60% by weight, preferably up to 10% by weight, based on the total weight of the mixture, of 2,4-diphenylmethane diisocyanate, and, optionally, up to 5% by weight, based on the total weight of the mixture, of 2,2'-diphenylmethane diisocyanate. In addition to the above-mentioned isomers of diphenylmethane diisocyanate, these mixtures may contain up to 70% by weight, based on the total weight of the mixture, of higher functional polyisocyanates of the diphenylmethane series.

Solutions of these technical mixtures in organic solvents, and in particular, monochlorobenzene, are also suitable to be used as starting material for the process according to the invention.

Thus, in accordance with the present invention, the extinction values (e-values), as measured at 520 nm, of polymethylene poly(phenyl isocyanates) can advantageously be lowered (or decreased) very easily without the use of additional auxiliary substances.

PMDI which has been brightened in accordance with the present invention can be used as the isocyanate component for the production of polyurethane foams and of other polyurethane plastics produced by the polyaddition process. Accordingly, this invention also provides a process for the production of polyurethane plastics which are suitable for use in color sensitive applications, by reacting an isocyanate component with an isocyanate-reactive component wherein the PMDI brightened in accordance with the present invention is used as the isocyanate component.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

Example 1

An apparatus of the type shown in FIG. 1 was used. In FIG. 1, the apparatus consists of a cryostat 1 which maintains the temperature of the PMDI at a low temperature. The PMDI is pumped through the reactor 5 (or condenser) in a loop system via a peristaltic pump 2 and irradiated by means of a radiation lamp 3. The protective wall 4 encloses the reactor 5 and the radiation lamp 3.

In this example, this apparatus specifically consisted of a glass reactor 5 having a capacity of 300 cc and having an irradiating surface area of 1,250 cm$^2$. The PMDI product was pumped through the reactor 5 in a loop system by means of a peristaltic pump 2, and irradiated using a Philips UV lamp 3 model HPA 400 S (of 400 W).

For the experiment, PMDI having a color corresponding to an extinction value E-520 (e-value at 520 nm) of 0.048 was taken from the industrial production process. 700 g of this product was irradiated through the reactor at a flow of 120 g/min.

After effective irradiation of the entire composition for 15 minutes, the E-520 fell to 0.025; after 30 minutes it fell to 0.020; and after 45 minutes it fell to 0.016.

All other quality variables of the product remain unchanged after the irradiation. The MDI modifications produced from irradiated MDI complied with all quality specifications.

Example 2

Figure 2:
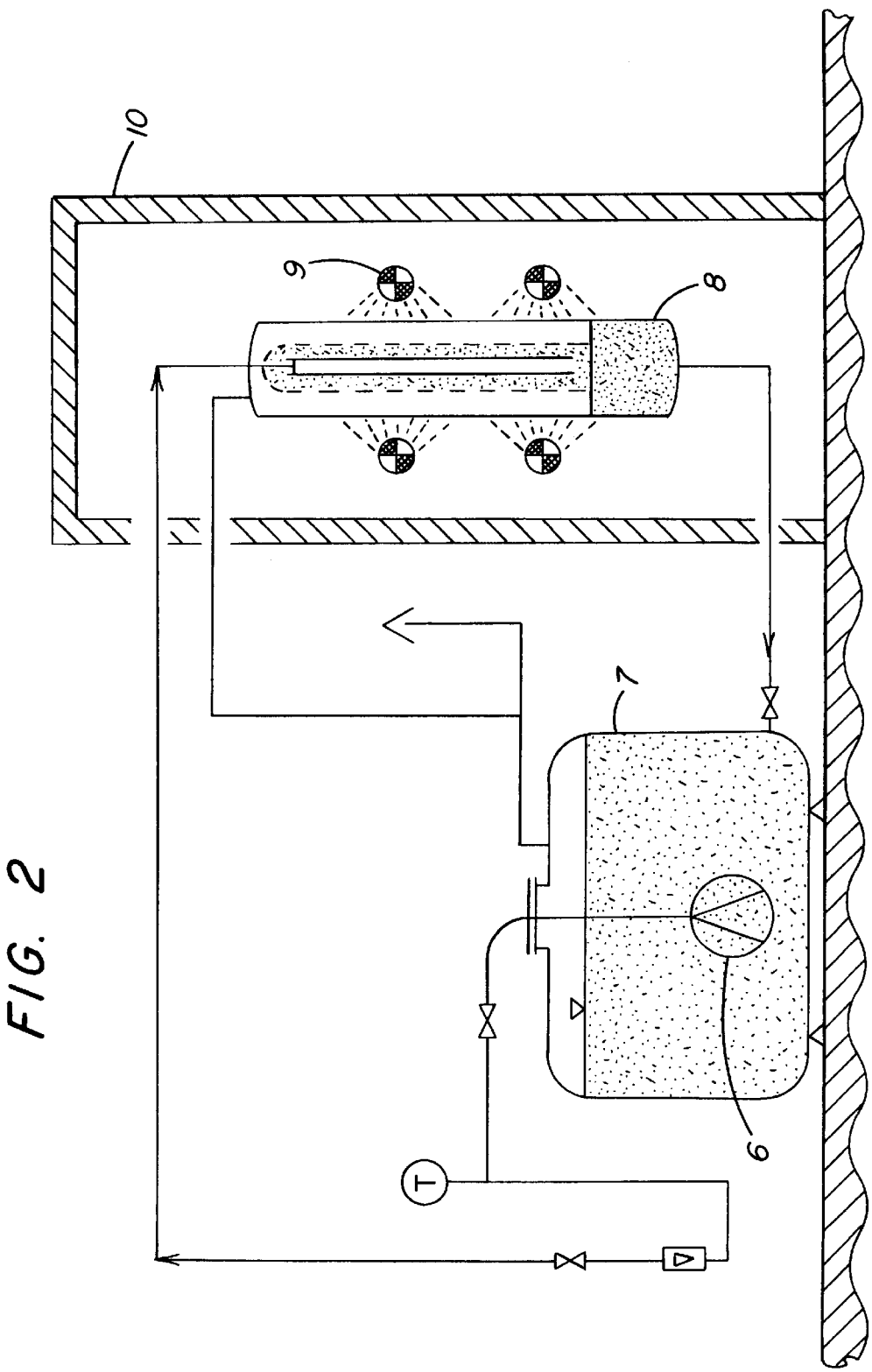
FIG. 2 illustrates another simple arrangement of equipment which can be used to treat PMDI with light of various wavelengths.

An apparatus of the type shown in FIG. 2 was used. In FIG. 2, the PMDI product is pumped from the tank 2 via a pump 1 in the top of the reactor 3 through a loop system and back to the tank 2. While in the reactor 3, the PMDI passes by radiation lamp(s) 4. The protective wall 5 encloses the reactor 3 and the radiation lamp(s) 4.

The specific apparatus used in this example consisted of a falling-film reactor 3 having external glass walls. The product was pumped in from the tank 2 via the pump 1 at the top of the reactor 3 in a loop system, with a thin film being formed. The layer thickness was controlled by regulating the flow of the quantity of PMDI pumped.

The irradiating surface area of the reactor corresponded to 1.25 m$^2$. Eight Philips UV lamps 4, model HPA 400 S (each of 400 W), were used for the irradiation.

For the experiment, PMDI having a color corresponding to an extinction value E-520 of 0.043 was taken from the industrial production process. 250 kg of this product was irradiated through the reactor at a flow of 500 kg/h. Nitrogen was blown through the entire installation before the reactor was started up.

After effective irradiation of the entire composition for 12 minutes, the E-520 value fell to 0.030 and after 14 minutes, the E-520 value fell to 0.027.

All other quality variables of the product, as in Example 1, remained unchanged after the irradiation. The MDI modifications produced from irradiated MDI also complied with all quality specifications.

The process can be optimized by adapting the reactor design and the electrical power used relative to the quantity of product (PMDI) to be irradiated.

FIG. 1: Apparatus in Example 1
(1) cryostat
(2) peristaltic pump
(3) radiation lamp
(4) protective wall
(5) condenser FIG. 2: Apparatus in Example 2
(1) pump
(2) tank
(3) reactor
(4) radiation lamp
(5) protective wall Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

We claim:

1. A process for decreasing the color of polymethylene poly(phenyl isocyanate) comprising treating polymethylene poly(phenyl isocyanate) with light having a wavelength in the range of from about 250 nm to about 2,500 nm.

2. The process of claim 1, wherein the light has a wavelength of from 300 nm to 450 nm.

3. The process of claim 1, wherein said polymethylene poly(phenyl isocyanate) comprises a mixture of the 2,2'-diphenylmethane diisocyanate, the 2,4'-diphenylmethane diisocyanate and the 4,4'-diphenylmethane diisocyanate, and contains up to 70% by weight, based on the total weight of the polymethylene poly(phenyl isocyanate) mixture, of higher functional polyisocyanates of the diphenylmethane series.

4. The process of claim 1, wherein the treatment is carried out for a period of from 2 sec. to 30 min.

5. The process of claim 1, wherein said polymethylene poly(phenyl isocyanate) is dissolved in one or more organic solvents.

6. The process of claim 5, wherein said solvent comprises monochlorobenzene.

7. In a process for the production of polyurethane plastics by the isocyanate polyaddition process comprising reacting one or more isocyanate component with one or more isocyanate-reactive component, the improvement wherein said isocyanate component is produced by the process of claim 1.

* * * * *